United States Patent
Donaldson et al.

(10) Patent No.: US 7,364,128 B2
(45) Date of Patent: Apr. 29, 2008

(54) METHODS AND APPARATUS FOR SUPPORT MECHANISM ASSEMBLY

(75) Inventors: Brad Donaldson, Corvallis, OR (US); Arnold Top, Albany, OR (US)

(73) Assignee: GE Security, Inc., Austin, TX (US)

( * ) Notice: Subject to any disclaimer, the term of this patent is extended or adjusted under 35 U.S.C. 154(b) by 264 days.

(21) Appl. No.: 11/114,395

(22) Filed: Apr. 26, 2005

(65) Prior Publication Data

US 2006/0237606 A1    Oct. 26, 2006

(51) Int. Cl.
*E04G 3/00* (2006.01)

(52) U.S. Cl. .............................. 248/292.12; 248/183.4; 248/184.1; 248/660; 248/274.1; 248/637; 396/428; 396/12; 396/13

(58) Field of Classification Search ........... 248/292.12, 248/183.4, 184.1, 660, 274.1, 637; 396/428, 396/12, 13
See application file for complete search history.

(56) References Cited

U.S. PATENT DOCUMENTS

| | | | | |
|---|---|---|---|---|
| 1,798,446 | A | * | 3/1931 | Zerk ........................ 248/181.1 |
| 1,947,555 | A | * | 2/1934 | Kanolt ........................ 352/69 |
| 2,362,773 | A | * | 11/1944 | Robinson .................... 33/299 |
| 3,064,547 | A | * | 11/1962 | Humphries ................. 396/428 |
| 3,638,502 | A | * | 2/1972 | Leavitt et al. ............... 74/5.34 |
| 3,931,742 | A | * | 1/1976 | Shirley ......................... 74/5.7 |
| 5,134,435 | A | * | 7/1992 | Tsuboi et al. ............... 396/169 |
| 5,223,872 | A | * | 6/1993 | Stiepel et al. .............. 396/427 |
| 5,383,645 | A | * | 1/1995 | Pedut et al. ................. 248/637 |
| 5,416,547 | A | * | 5/1995 | SanGregory et al. ....... 396/133 |
| 5,426,476 | A | * | 6/1995 | Fussell et al. ................ 396/12 |
| 5,602,604 | A | * | 2/1997 | SanGregory ................. 396/25 |
| 5,826,321 | A | * | 10/1998 | Pease ........................ 29/426.1 |
| 5,933,672 | A | * | 8/1999 | Huang ......................... 396/536 |
| 5,964,443 | A | * | 10/1999 | Leveille ..................... 248/478 |
| 6,019,524 | A |   | 2/2000 | Arbuckle |
| 6,234,691 | B1 |   | 5/2001 | Jones et al. |
| 6,354,749 | B1 | * | 3/2002 | Pfaffenberger, II ......... 396/427 |
| 6,357,936 | B1 |   | 3/2002 | Elberbaum |
| 6,491,265 | B2 | * | 12/2002 | Tracy ......................... 248/154 |
| 6,535,357 | B1 | * | 3/2003 | Misso et al. ............. 360/256.2 |
| 6,708,943 | B2 | * | 3/2004 | Ursan et al. ................ 248/660 |
| 6,880,987 | B2 |   | 4/2005 | Diana et al. |
| 6,896,423 | B2 |   | 5/2005 | Arbuckle et al. |

* cited by examiner

*Primary Examiner*—Carl D. Friedman
*Assistant Examiner*—Michael McDuffie
(74) *Attorney, Agent, or Firm*—Eugene Hyun, Esq.; Armstrong Teasdale LLP (57) ABSTRACT

Methods and apparatus for a support mechanism are provided. The support mechanism includes an engagement pin including an engagement surface and a latch surface wherein the engagement pin is coupled to a base. The support mechanism also includes a pawl that includes an engagement surface complementary to the pin engagement surface and a latch surface complementary to the pin latch surface wherein the pawl is biased toward engagement of the pawl latch surface with the pin latch surface. The support mechanism also includes a ring latch that includes an annular ring having a toothed edge, the ring latch is coupled to the pawl such that the pawl extends axially away from the ring latch in a direction opposite the toothed edge.

16 Claims, 6 Drawing Sheets

502
Engaging a rotatable toothed shroud to a toothed ring latch using an axial force to reposition the shroud from a relaxed position to an engaged position

504
Rotating the shroud and ring latch using a rotational force applied to the shroud to unlatch the removable unit from the base

506
Withdrawing the removable unit from the base using the weight of the removable unit

508
Aligning a locating round of the base with a complementary locating socket of the removable unit

510
Latchably coupling the removable unit to the base using an axial force applied to the shroud on a side opposite the base

FIG. 6

METHODS AND APPARATUS FOR SUPPORT MECHANISM ASSEMBLY

BACKGROUND OF THE INVENTION

This invention relates generally to video surveillance systems and, more particularly, to assembling and disassembling camera pan, tilt, and zoom assemblies.

At least some known video surveillance systems include one or more video cameras mounted in a housing along with a pan, tilt, and zoom (PTZ) assembly. The PTZ permits controlling a movement of the camera to align a viewing area of the camera with an object of interest or location of interest. The zoom portion of the mechanism may be used to adjust a field of view of the camera. The housing protects the camera from the environment in the location where the camera and PTZ assembly are mounted.

During initial installation and periodically thereafter, the camera and/or PTZ assembly may need to be removed from it's mounted location. For example, over time, the camera and/or PTZ assembly may require maintenance to restore a damaged or worn camera or PTZ assembly to an operable condition. When installing, repairing, or replacing a PTZ assembly a maintenance person is frequently required to use two hands to unlatch the mechanism that supports the PTZ assembly and remove it from its housing. At least some known PTZ assemblies are positioned in an elevated location, therefore using two hands to remove the PTZ assembly creates a safety hazard. In addition, when installing, repairing, or replacing a PTZ assembly a maintenance person is frequently required to push and/or pull with a great amount of force to install or remove the PTZ assembly from its housing. Such actions can cause a safety hazard by unbalancing a person high in the air on a ladder or lifting mechanism. Requiring the use of a man-lift or other lifting mechanism, so that two hands may be used also increases the cost of removing and installing the camera and PTZ assembly.

At least some known PTZ assemblies are compact in size such that various hazards can arise from placing a hand into these mechanisms, for example, to loosen fasteners, catches, and/or latches, or during insertion and removal of the PTZ assembly. A part of the PTZ assembly falling from the elevated mounting position can create a safety hazard as well. A PTZ assembly falling from an elevated position could cause death or serious bodily injury such that positive control and installation of the PTZ assembly is required. At least some known PTZ attachment mechanisms create a "false positive" indication of attachment, such that the user believes the mechanism is securely attached in place when it is not.

A previous attempt to address the afore mentioned problems included a radial handle located inside the PTZ assembly housing. When pulled, the handle would engage symmetrical pawls on leaf springs releasing the PTZ mechanism. However, an uneven distribution of downward forces, sometimes caused binding between the engaged components and inserting a hand into the housing created a safety hazard for the user and limited the compactness of the design. A second attempt to address the problems described above included a toothed bracket that was constrained to linear motion tangent to a shroud of the PTZ assembly. The shroud was also toothed, and when engaged, the teeth would align and the bracket could be moved. The bracket included a wedge design that would move over a stubby nose spring plunger, creating the upward force necessary to hold the PTZ assembly in place. However, the linear motion of the bracket causes binding because the motion of the shroud was radial and the latching of the PTZ assembly is not positive such that the user is required to apply a force to engage the latch.

BRIEF DESCRIPTION OF THE INVENTION

In one embodiment, a support mechanism is provided. The support mechanism includes an engagement pin including an engagement surface and a latch surface wherein the engagement pin is coupled to a base. The support mechanism also includes a pawl including an engagement surface complementary to the pin engagement surface and a latch surface complementary to the pin latch surface wherein the pawl is biased toward engagement of the pawl latch surface with the pin latch surface. The support mechanism also includes a ring latch that includes an annular ring having a toothed edge, the ring latch is coupled to the pawl such that the pawl extends axially away from the ring latch in a direction opposite the toothed edge.

In another embodiment, a support mechanism is provided. The support mechanism includes a base, a pan motor having a longitudinal axis, and a removable unit. The pan motor includes a stationary member coupled to the base and a rotatable member rotatably coupled to the stationary member. The removable unit is configured to latchably couple to the base using a first axial force applied to the removable unit. The removable unit is also configured to release from the base using a second axial force and a rotational force in sequential combination.

In yet another embodiment, a method of operating a support mechanism is provided. The support mechanism includes a base and a removable unit latchably coupled to the base. The method includes engaging a rotatable toothed shroud to a toothed ring latch using a an axial force to reposition the shroud from a relaxed position to an engaged position, rotating the shroud and ring latch using a rotational force applied to the shroud to unlatch the removable unit from the base, and withdrawing the removable unit from the base using at least one of the weight of the removable unit and an ejection bias member.

DETAILED DESCRIPTION OF THE INVENTION

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
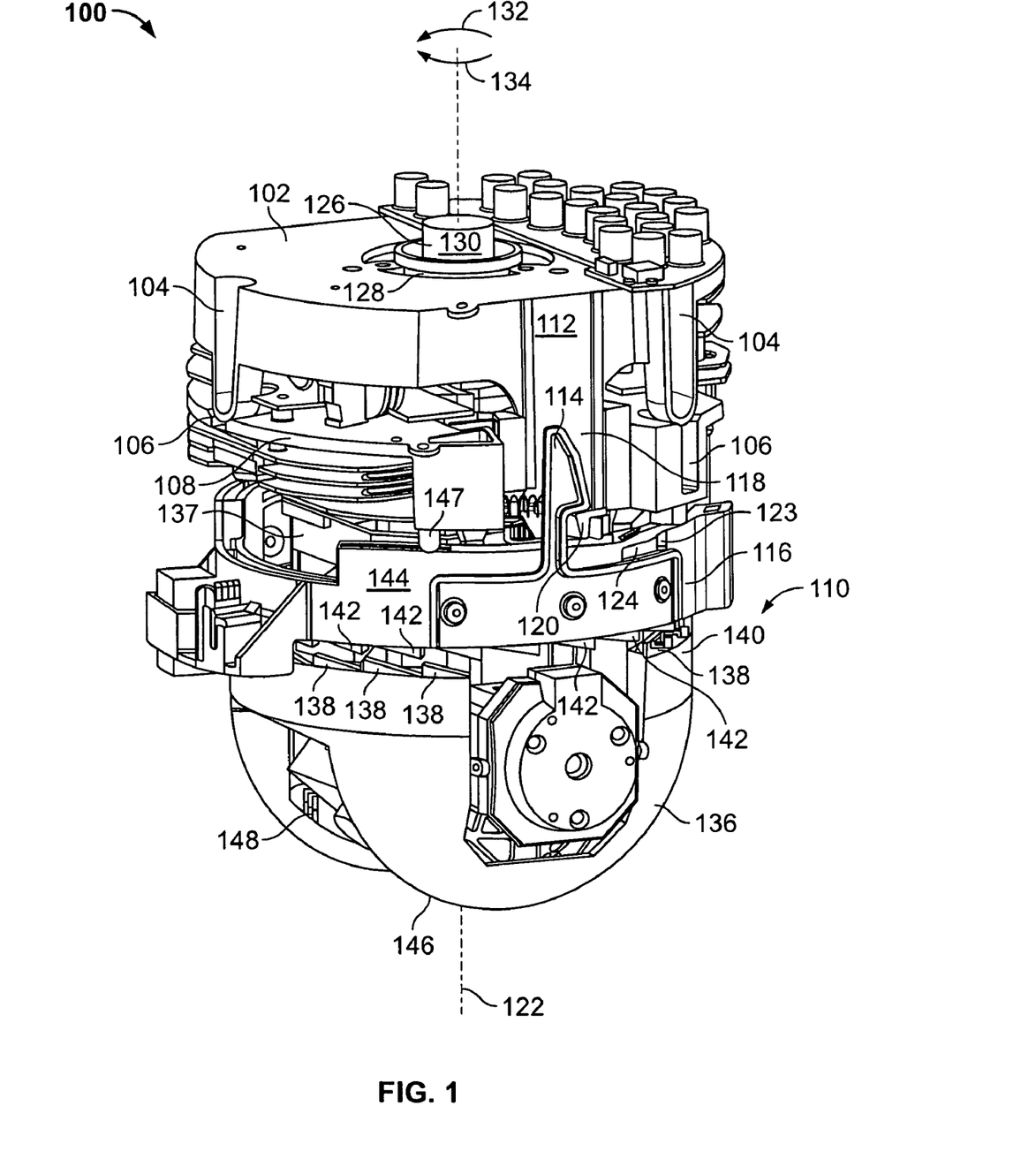
FIG. 1 is a perspective view of an exemplary video camera pan, tilt, and zoom assembly in accordance with an embodiment of the present invention.

FIG. 1 is a perspective view of an exemplary video camera pan, tilt, and zoom assembly 100 in accordance with an embodiment of the present invention. PTZ assembly 100 includes an upper bracket or base 102 coupled to an interior portion of a housing. The housing is configured to be fixedly coupled to a structure such as a ceiling, stanchion, post, or other suitable mount able to support the weight of PTZ assembly 100 and is a stable platform to facilitate reducing jitter. Jitter may be apparent in the camera image due to vibration or swaying of PTZ assembly 100.

Base 102 includes one or more locating rounds 104 that are complementary to locating slots 106 in a lower bracket 108 of a removable unit 110. Locating rounds 104 and locating slots 106 are used to align removable unit 110 and base 102 prior to coupling removable unit 110 to base 102. Base 102 also includes one or more guides 112 configured to receive a pawl 114 coupled to a ring latch 116 on removable unit 110. In the exemplary embodiment, a second pawl (not shown) is oriented similarly to pawl 114 and spaced approximately 180 degrees from pawl 114. In an alternative embodiment, a different number of pawls are used. A distal end 118 of guide 112 includes a pin 120 extending away from guide 112 in a radial direction with respect to a longitudinal axis 122 of PTZ assembly 100. Pawl 114 and pin 120 are configured to engage to transfer the weight of removable unit 110 to base 102 to support removable unit 110. In various embodiments of the present invention pin 120 is configured as a rotatable wheel.

Ring latch 116 is rotatably coupled to lower bracket 108. The amount of rotation ring latch 116 is capable of is limited by a plurality of stops 123 and complementary grooves 124 that engage to limit the rotational travel of ring latch 116 with respect to lower bracket 108. A stationary member 128 of pan motor 126 is fixedly coupled to lower bracket 108. When pan motor 126 rotates, removable unit 110 rotates with the rotatable member and with respect to base 102. A slip ring 130 permits removable unit 110 to rotate continuously in a first rotational direction 132 or a second opposite direction 134.

Removable unit 110 includes a shroud 136 that is slidably coupled to a chassis 137. Shroud 136 is configured to maintain a relaxed position (shown in FIG. 1) and an engaged position. In the engaged position, a plurality of teeth 138 arranged circumferentially about an outer periphery 140 of shroud 136 and extending axially toward ring latch 116 are configured to mesh with a complementary plurality of teeth 142 arranged circumferentially about an outer periphery 144 of ring latch 116 and extending axially toward teeth 138. Shroud 136 is translated from the relaxed position to the engaged position by applying an upward axial force to a bottom side 146 of shroud 136. The movement associated with positioning shroud 136 from the relaxed position to the engaged position compresses or tensions a plurality of bias members 148 coupled between shroud 136 and chassis 137. A plurality of travel limiters 147 limit the upward movement of ring latch 116 with respect to lower bracket 108. Bias members 148 are configured to return shroud 136 to the relaxed position when the axial force applied to shroud 136 is removed.

Ring latch 116 is configured to rotate at least partially about axis 122 and shroud 136 is configured to rotate freely about axis 122 with chassis 137 and the rotatable member of pan motor 126. Accordingly, with teeth 138 and 142 engaged by an axial force applied to shroud 136, an additional rotational force may be applied to shroud 136 to cause ring latch to rotate. Pawl 114 rotates with ring latch 116 toward or away from pin 120. If pawl 114 rotates away from pin 120, the weight of removable unit 110 will no longer be supported by the engagement of pawl 114 and pin 120 and removable unit 110 will be released from base 102 by its own weight. In an alternative embodiment, one or more ejection springs are configured to apply a bias force to removable unit 110 to assist in disengaging removable unit 100 from base 102.

Figure 2:
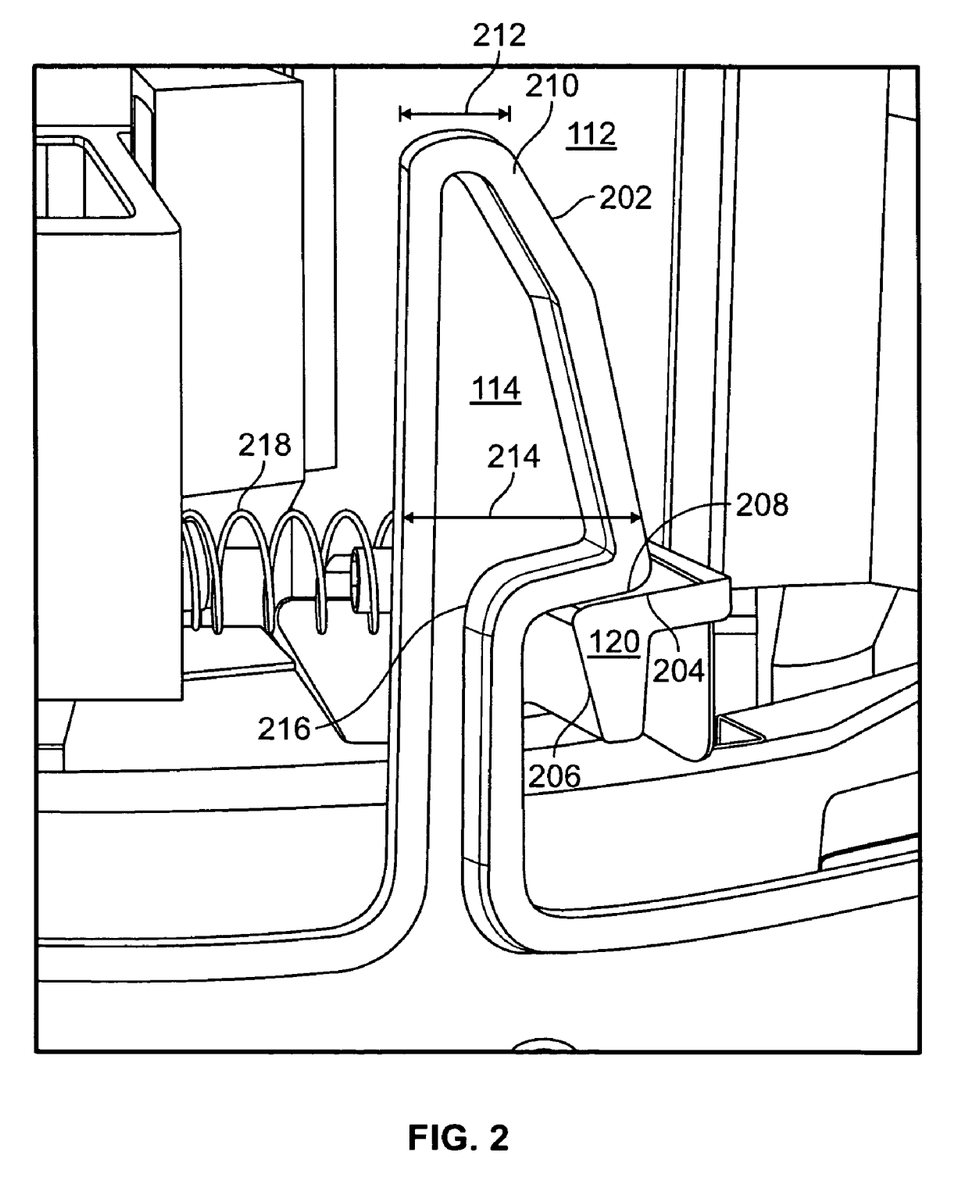
FIG. 2 is an enlarged perspective view of a portion of the PTZ assembly shown in FIG. 1.

FIG. 2 is an enlarged perspective view of a portion of PTZ assembly 100 (shown in FIG. 1). Pawl 114 extends axially away from ring latch 116 toward guide 112. Pawl 114 includes an engagement surface 202 and latch surface 204. Pin 120 extends radially from guide 112 and includes an engagement surface 206 and a latch surface 208. Engagement surface 206 is configured to engage engagement surface 202 during an installation procedure where removable unit 110 is coupled to base 102. A tip 210 of pawl 114 has a width 212 that is less than a width 214 of a root end 216 of pawl 114. As pawl 114 moves axially with respect to pin 120 during the installation procedure, engagement surface 206 engages engagement surface 202 and a rotational force generated by the inclined engagement surface 202 and stationary engagement surface 206 forces pawl 114 to move away from pin 120, which compresses a bias member 218. In the exemplary embodiment, bias member 218 is a coil spring. In various alternative embodiments, bias member 218 is a leaf spring, an extension spring, a constant force spring, or a resilient material.

Latch surface 208 is configured to engage latch surface 204 after engagement surface 202 clears engagement surface 206. Bias member 218 provides a rotational force to slide latch surface 204 over latch surface 208 such that the weight of removable unit 110 is transferred to pin 120 from pawl 114.

In FIG. 2, pin 120 is illustrated as a wedge-shape pin, in various alternative embodiments, pin 120 is a rotatable wheel that rolls along engagement surface 202 rather than sliding across it. The wheel is configured to engage latch surface 204 after the wheel clears engagement surface 202 during an installation procedure. A radially outer periphery of the wheel corresponds to engagement surface 206 and latch surface 208 and engages engagement surface 202 and latch surface 204.

Figure 3:
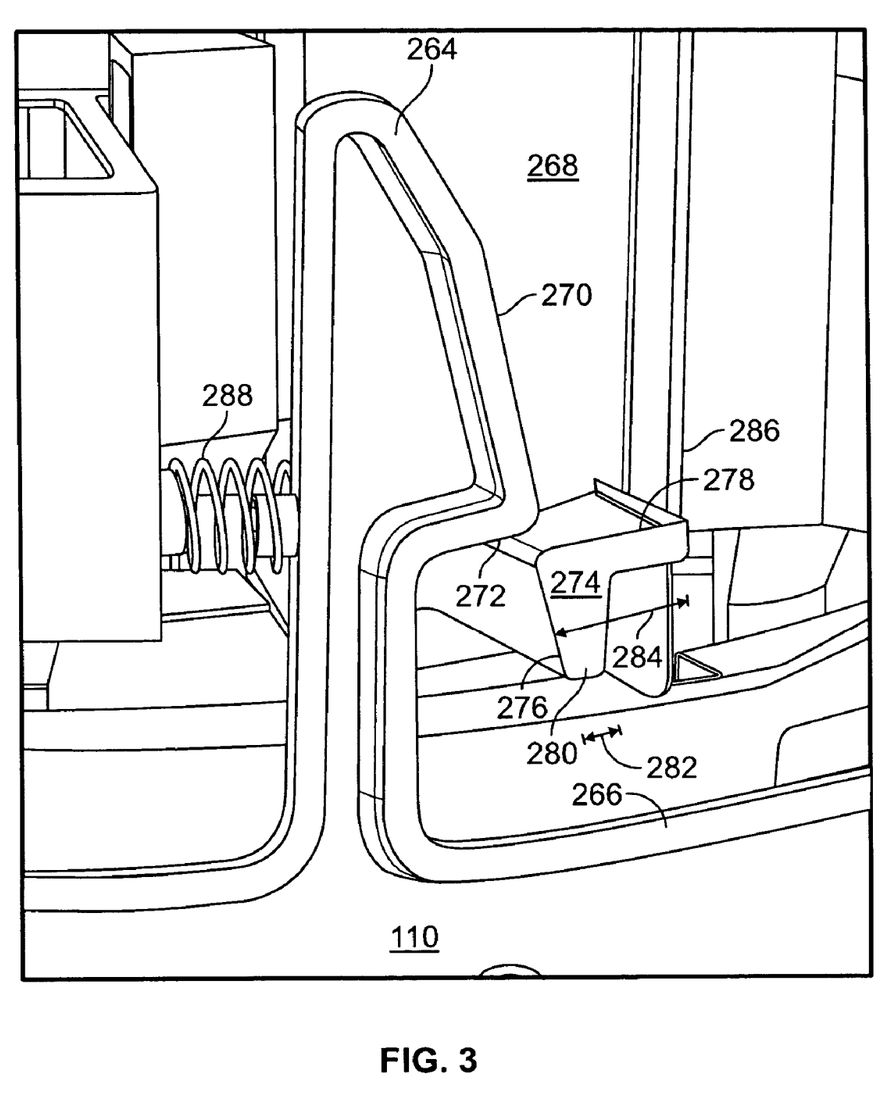
FIG. 3 is an enlarged perspective view of an alternative embodiment of a portion of the PTZ assembly shown in FIG. 1.

FIG. 3 is an enlarged perspective view of an alternative embodiment of a portion of PTZ assembly 100 (shown in FIG. 1). In this embodiment, a pin 264 extends axially away from ring latch 266 toward a guide 268. Pin 264 includes an engagement surface 270 and latch surface 272. A pawl 274 extends from guide 268 and includes an engagement surface 276 and a latch surface 278. Engagement surface 276 is configured to engage engagement surface 270 during an installation procedure where removable unit 110 is coupled to base 102. A tip 280 of pawl 274 has a width 282 that is less than a width 284 of a root end 286 of pawl 274. As pin 264 moves axially with respect to pawl 274 during the installation procedure, engagement surface 270 engages engagement surface 276 and a rotational force generated by the inclined engagement surface 270 and stationary engagement surface 276 forces pin 264 to move away from pawl 274, which compresses a bias member 288. In the exemplary embodiment, bias member 288 is a coil spring. In various alternative embodiments, bias member 288 is a leaf spring, an extension spring, a constant force spring, or a resilient material.

Latch surface 272 is configured to engage latch surface 278 after engagement surface 270 clears engagement surface 276. Bias member 288 provides a rotational force to slide latch surface 272 over latch surface 278 such that the weight of removable unit 110 is transferred to pawl 274 from pin 264.

In FIG. 3, pin 264 is illustrated as a wedge-shape pin, in various alternative embodiments, pin 264 is a rotatable wheel that rolls along engagement surface 276 rather than sliding across it. The wheel is configured to engage latch surface 278 after the wheel clears engagement surface 276 during an installation procedure.

Figure 4:
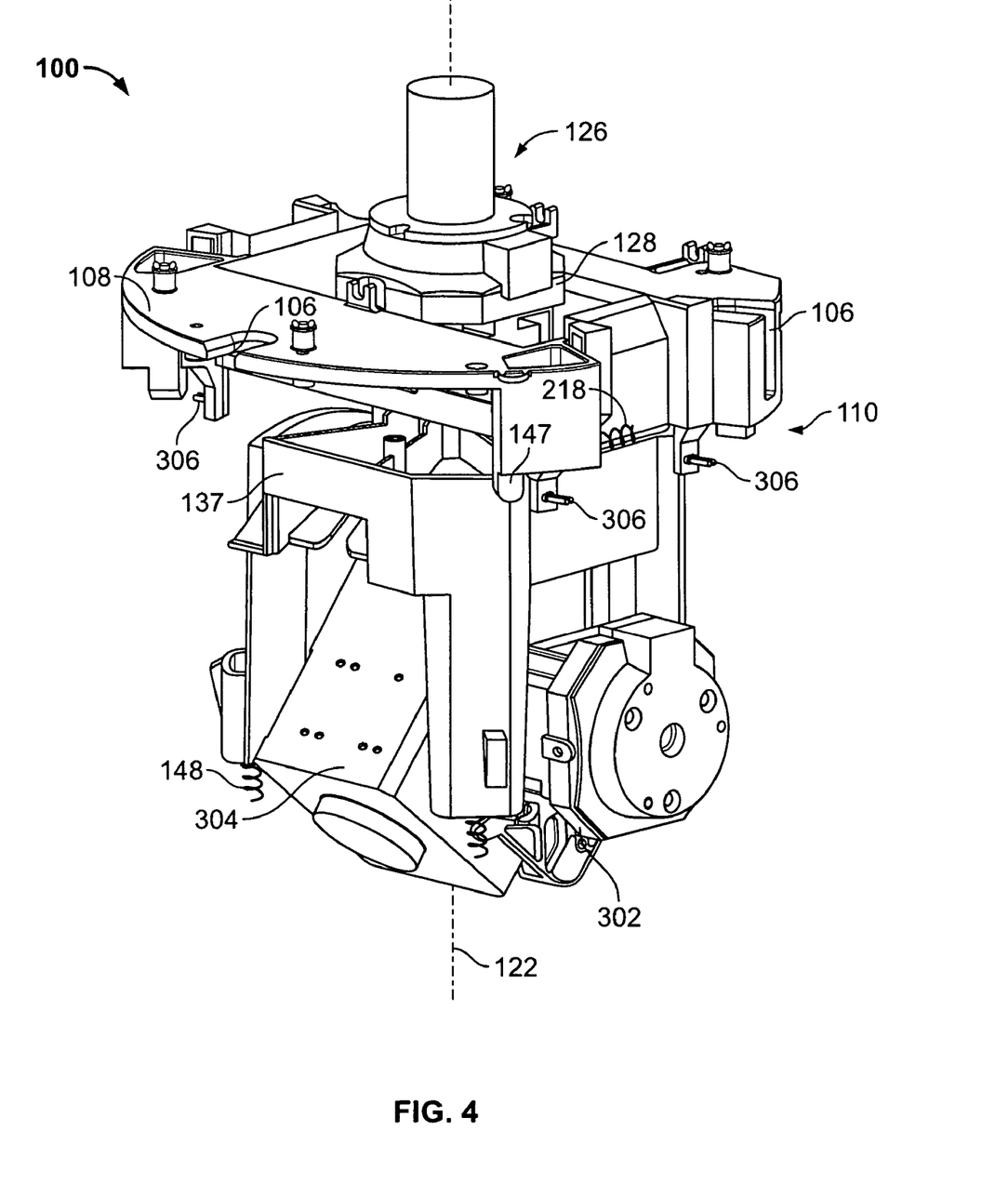
FIG. 4 is a perspective view of the exemplary PTZ assembly shown in FIG. 1 with parts removed.

FIG. 4 is a perspective view of exemplary PTZ assembly 100 (shown in FIG. 1) with parts removed. Specifically, PTZ assembly 100 is illustrated with base 102, shroud 136, and ring latch 116 removed. PTZ assembly 100 includes a tilt motor 302 coupled to chassis 137 and to a video camera 304 such that a rotation of tilt motor 302 defines a tilt angle of camera 304 with respect to axis 122. A plurality of tabs 306 extending radially away from lower bracket 108 support ring latch 116 in an axial direction and are configured to permit ring latch 116 to rotate.

Figure 5:
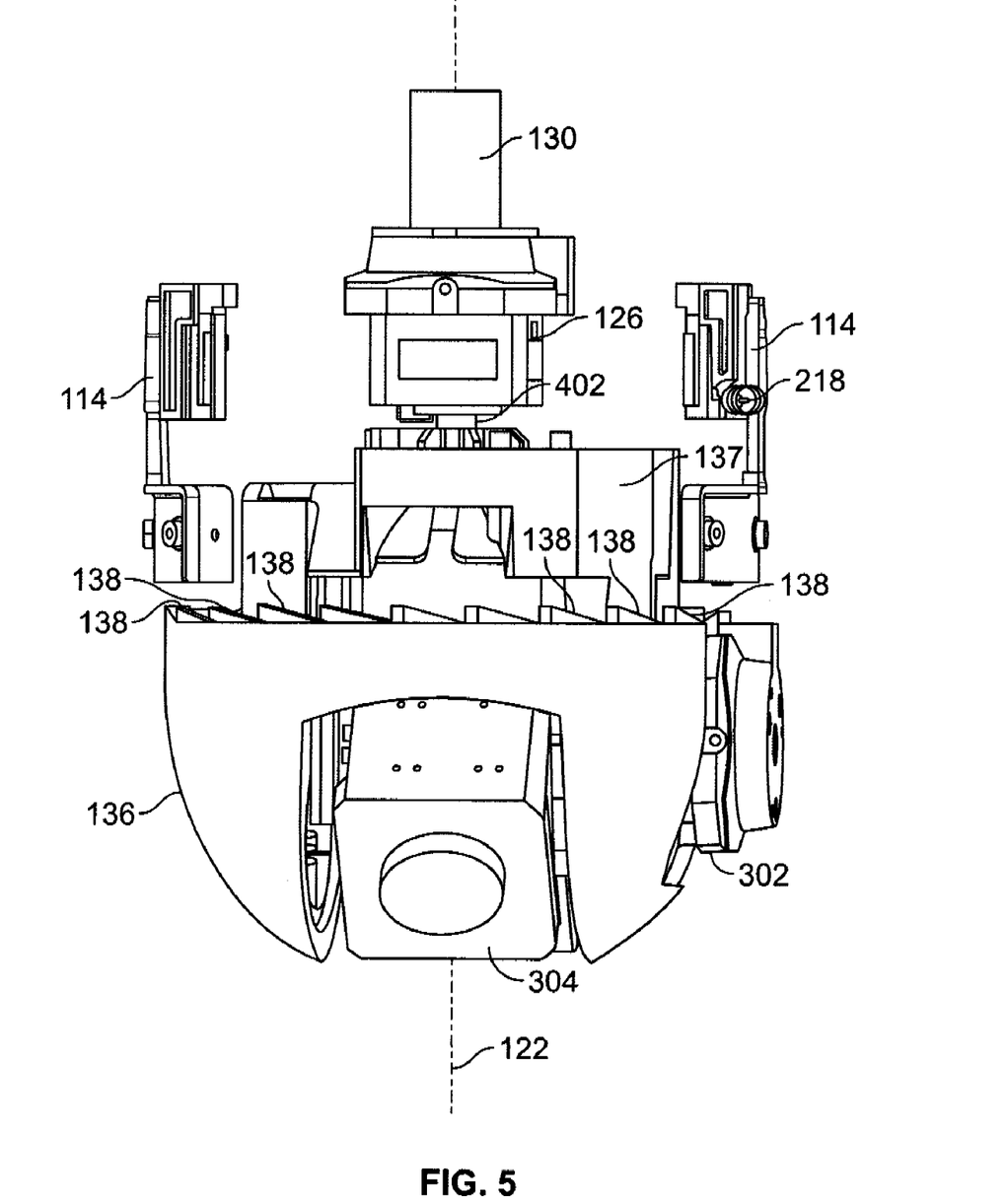
FIG. 5 is a perspective view of the exemplary PTZ assembly shown in FIG. 1 with different parts removed than shown in FIG. 3.

FIG. 5 is a perspective view of exemplary PTZ assembly 100 (shown in FIG. 1) with different parts removed than shown in FIG. 3. Specifically, PTZ assembly 100 is illustrated with base 102, lower bracket 108, and ring latch 116 removed. PTZ assembly 100 includes a rotatable member 402 of pan motor 126 coupled to chassis 137 such that a rotation of pan motor 126 defines a rotation of chassis 137 about axis 122.

Figure 6:
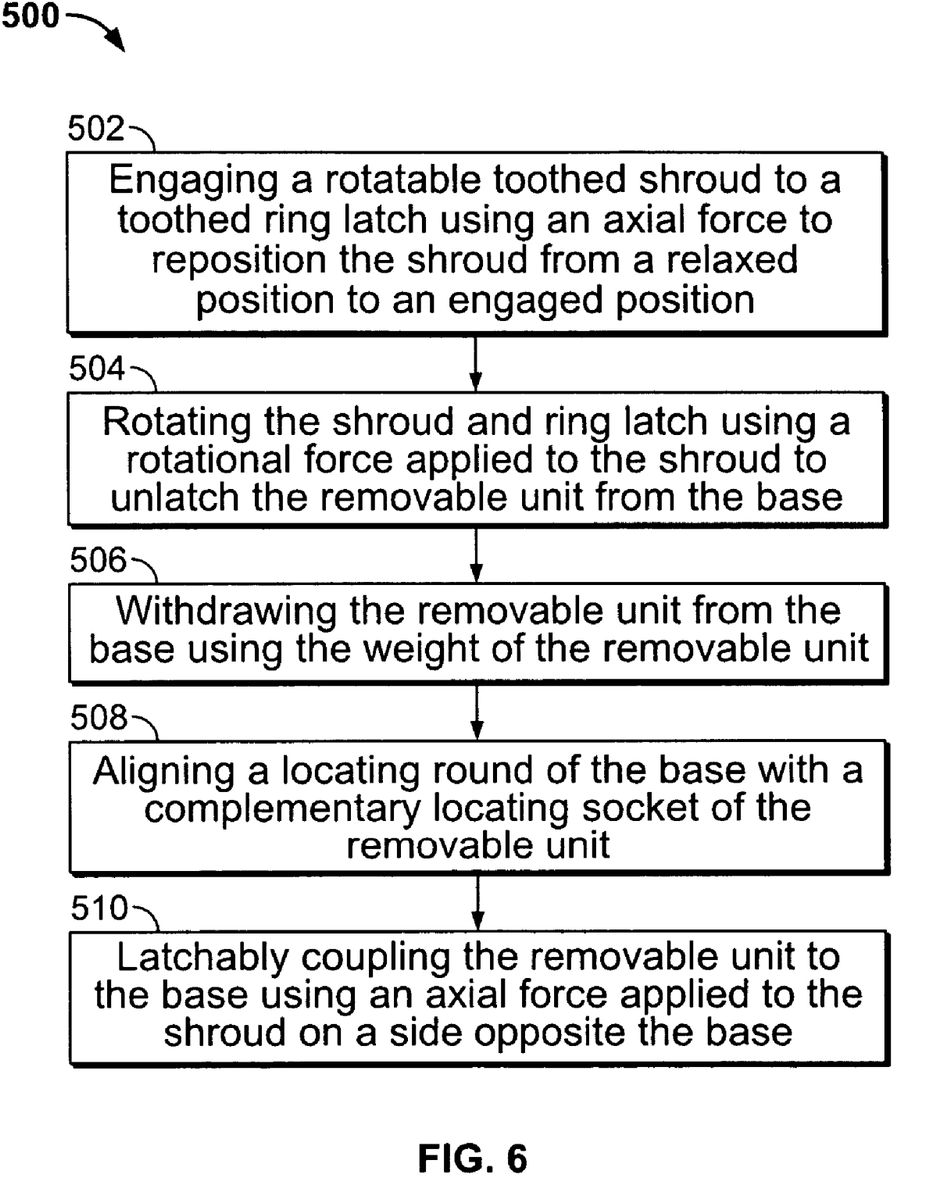
FIG. 6 is a flowchart of an exemplary method of operating a support mechanism that includes a base and a removable unit latchably coupled to the base.

FIG. 6 is a flowchart of an exemplary method 500 of operating a support mechanism that includes a base and a removable unit latchably coupled to the base. In the exemplary embodiment, the removable unit is a PTZ assembly configured to support a video camera and permit rotation of the camera field of view about a pan axis and a tilt axis. The removable unit includes a pawl and pin latch mechanism that permits attachment of the removable unit to the base using a force acting along the pan axis, such as by a user's hand supporting the removable unit and the user supplying an upward force from the bottom of the removable unit. To release the removable unit, an upward force is applied to the bottom of the removable unit to engage two sets of teeth. A rotation force is then applied to the removable unit to unlock the pawl and pin latch mechanism. The rotational force is transmitted through the meshed teeth to move the pawl from a latched position to an unlatched position with respect to the pin. The weight of the removable unit permits the removable unit to separate from the base with substantially no additional force required.

To release the removable unit of an assembled PTZ assembly, method 500 includes engaging 502 a rotatable toothed shroud to a toothed ring latch using a an axial force to reposition the shroud from a relaxed position to an engaged position, rotating 504 the shroud and ring latch using a rotational force applied to the shroud to unlatch the removable unit from the base, and withdrawing 506 the removable unit from the base using the weight of the removable unit.

To install the removable unit to the base, method 500 includes aligning 508 a locating round of the base with a complementary locating socket of the removable unit, and latchably coupling 510 the removable unit to the base using an axial force applied to the shroud on a side opposite the base.

Although the embodiments described herein are discussed with respect to a video surveillance system, it is understood that the coupling and release mechanism described herein may be used with other mechanical and electro-mechanical systems.

It will be appreciated that the use of first and second or other similar nomenclature for denoting similar items is not intended to specify or imply any particular order unless otherwise stated.

The above-described embodiments of a video surveillance system provide a cost-effective and reliable means for a latching mechanism that allows the PTZ assembly to be installed and removed using only one hand, thus allowing the user to keep one hand secured to a ladder or lifting mechanism, and that requires a relatively small amount of upward force to install and substantially zero downward force to remove. The latching mechanism also operates such that the user's hand only comes in contact with the shroud to facilitate reducing pinch points and crush points and does not create a false positive installation indication.

Exemplary embodiments of video surveillance systems and apparatus are described above in detail. The video surveillance system components illustrated are not limited to the specific embodiments described herein, but rather, components of each system may be utilized independently and separately from other components described herein. For example, the video surveillance system components described above may also be used in combination with different video surveillance system components. A technical effect of the various embodiments of the systems and methods described herein include facilitating operation and maintenance of video surveillance system by permitting relatively simple interchangeability and maintenance of cameras.

While the invention has been described in terms of various specific embodiments, those skilled in the art will recognize that the invention can be practiced with modification within the spirit and scope of the claims.

What is claimed is:

1. A support mechanism comprising:
   an engagement pin comprising an engagement surface and a latch surface, said engagement pin coupled to a base;
   a pawl comprising an engagement surface complementary to said pin engagement surface and a latch surface complementary to said pin latch surface, said pawl rotationally biased toward engagement of said pawl latch surface with said pin latch surface; and
   a ring latch comprising an annular ring having a toothed edge, said ring latch coupled to said pawl such that said pawl extends axially away from said ring latch in a direction opposite said toothed edge.

2. A support mechanism in accordance with claim 1 further comprising a shroud rotatable about a longitudinal axis, said shroud comprising a toothed edge complementary to said ring latch toothed edge.

3. A support mechanism in accordance with claim 2 wherein said shroud is configured to slidably couple to a chassis, said chassis configured to rotate with respect to said base.

4. A support mechanism in accordance with claim 2 further comprising a biasing member coupled between said chassis and said shroud, said biasing member configured to apply a force to said shroud in a direction away from said ring latch.

5. A support mechanism in accordance with claim 2 wherein said shroud toothed edge is configured to engage said ring latch toothed edge when a force is applied to said shroud in an axial direction toward said ring latch.

6. A support mechanism in accordance with claim 2 wherein said ring latch is configured to rotate with said shroud when said shroud toothed edge is engaged with said ring latch toothed edge and a rotational force is applied to said shroud.

7. A support mechanism in accordance with claim 6 wherein said pawl latch surface disengages from said pin latch surface when a rotational force is applied to said ring latch.

8. A support mechanism in accordance with claim 1 further comprising a bias member coupled between said pawl and a bracket coupled to said base through a locating pin and coupled to said ring latch.

9. A support mechanism comprising:
- an engagement pawl comprising an engagement surface and a latch surface, said engagement pawl coupled to a base;
- a pin comprising an engagement surface complementary to said pawl engagement surface and a latch surface complementary to said pawl latch surface, said pin rotationally biased toward engagement of said pin latch surface with said pawl latch surface; and
- a ring latch comprising an annular ring having a toothed edge, said ring latch coupled to said pin such that said pin extends axially away from said ring latch in a direction opposite said toothed edge.

10. A support mechanism comprising:
- a base;
- a pan motor having a longitudinal axis, said pan motor comprising a stationary member coupled to said base and a rotatable member rotatably coupled to said stationary member; and
- a removable unit configured to latchably couple to said base using a first axial force applied to said removable unit and using a first rotational force applied to said removable unit by a biasing member coupled to said stationary member, said removable unit configured to release from said base using a second axial force and a second rotational force in sequential combination.

11. A support mechanism in accordance with claim 10 wherein said removable unit comprises a pawl comprising an engagement surface and an adjacent latch surface, said pawl configured to latchably couple to a pin extending from said base.

12. A support mechanism in accordance with claim 10 wherein said removable unit comprises a pin comprising an engagement surface and an adjacent latch surface, said pin configured to latchably couple to a pawl extending from said base.

13. A support mechanism in accordance with claim 11 wherein said pin comprises a pin engagement surface configured to:
- engage said engagement surface during a movement of said pawl in an axial direction in response to said first axial force; and
- deflect said pawl in a circumferential direction about the longitudinal axis, the deflection of the pawl tensioning said bias member acting on said pawl.

14. A support mechanism in accordance with claim 11 wherein said pin comprises a pin latch surface configured to engage said pawl latch surface when said an end of said pawl engagement surface clears an end of said pin engagement surface.

15. A support mechanism in accordance with claim 11 wherein said pawl is fixedly coupled to a ring latch, said removable unit further comprising a shroud having a plurality of axially projecting teeth, said plurality of teeth configured to engage a matching plurality of teeth on said ring latch.

16. A support mechanism in accordance with claim 15 wherein said shroud is configured to move axially to engage said matching plurality of teeth and then rotationally to disengage said pawl from said pin.

* * * * *